(12) United States Patent
Chen et al.

(10) Patent No.: US 12,287,478 B2
(45) Date of Patent: Apr. 29, 2025

(54) LENS ASSEMBLY AND AUGMENTED REALITY GLASSES

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Shiue-Lung Chen, Hsinchu (TW); Chien-Cheng Kuo, Hukou (TW); I-Ming Cheng, Hsinchu (TW); Chang-Ho Chen, Hsinchu (TW); Ying-Hung Tsai, Hsinchu (TW); Chung-Wu Liu, Hsinchu (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(*) Notice: Subject to any disclaimer, the term of this patent is extended or adjusted under 35 U.S.C. 154(b) by 0 days.

(21) Appl. No.: 18/399,995

(22) Filed: Dec. 29, 2023

(65) Prior Publication Data
US 2025/0110331 A1 Apr. 3, 2025

(30) Foreign Application Priority Data
Sep. 28, 2023 (CN) .......................... 202322654715.6

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0178* (2013.01)

(58) Field of Classification Search
CPC ............ G02B 27/0093; G02B 27/0172; G02B 2027/0178; G02B 27/017
See application file for complete search history.

(56) References Cited

U.S. PATENT DOCUMENTS

2019/0163267 A1* 5/2019 Hainzl ................. G02B 27/017
2021/0263342 A1* 8/2021 Ouderkirk .......... G02B 27/0172

* cited by examiner

*Primary Examiner* — Abdul-Samad A Adediran
(74) *Attorney, Agent, or Firm* — ScienBiziP, P.C.

(57) ABSTRACT

A lens assembly and Augmented Reality (AR) glasses, including a waveguide substrate, a wiring layer, a protective layer, an eye tracking component, and a lens. The waveguide substrate includes a first surface. The wiring layer is disposed on the first surface. The protective layer is disposed on the first surface and covering the wiring layer. The eye tracking component is disposed in the protective layer and is electrically connected with the wiring layer for tracking position of an eyeball. The lens is connected to a side of the protective layer away from the waveguide substrate. The AR glasses includes a display device and two lens assemblies. The display device is positioned between the two lens assemblies for emitting image light to the waveguide substrates of the two lens assemblies.

18 Claims, 3 Drawing Sheets

LENS ASSEMBLY AND AUGMENTED REALITY GLASSES

FIELD

The present disclosure relates to field of augmented reality technology, and in particular to a lens assembly and Augmented Reality (AR) glasses.

BACKGROUND

The lens used in the AR glasses generally includes a wiring layer having an eye tracking function, a waveguide substrate, and a lens disposed on both sides of the wiring layer. In addition, at least one layer of auxiliary structure is provided between the waveguide substrate and the wiring layer, and the auxiliary structure is made of a resin such as polyimide, which not only protects the waveguide substrate, but also avoids the problem of debonding of the wiring layer when processing the waveguide substrate directly on the glass material. However, the setting of this auxiliary structure will result in the entire lens being thicker and the lens not being thin enough.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to;" it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
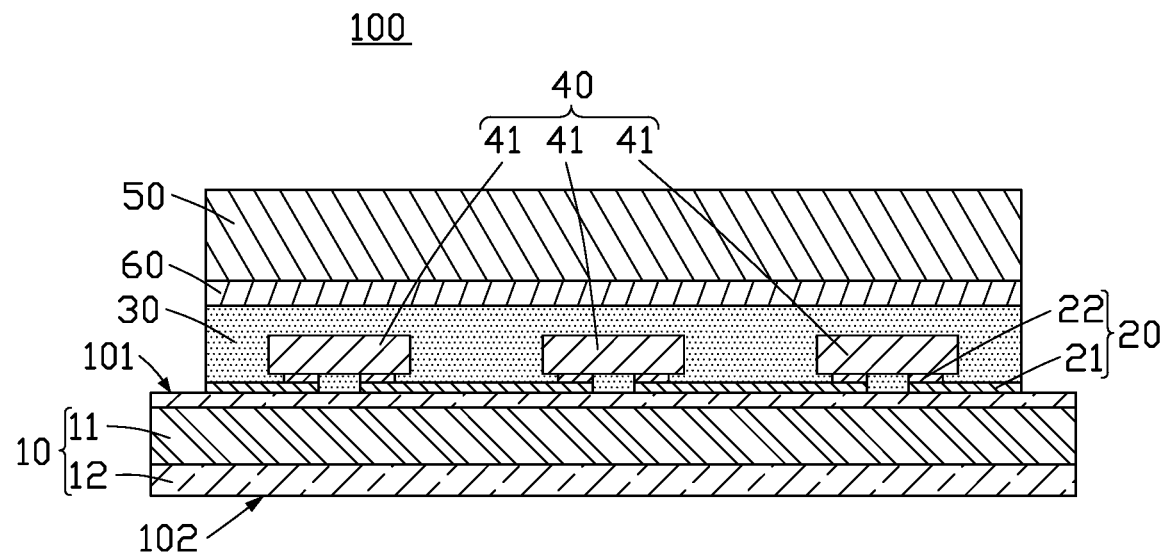
FIG. 1 shows a schematic diagram illustrating a structure of a lens assembly according to an embodiment of the present application.
Figure 2:
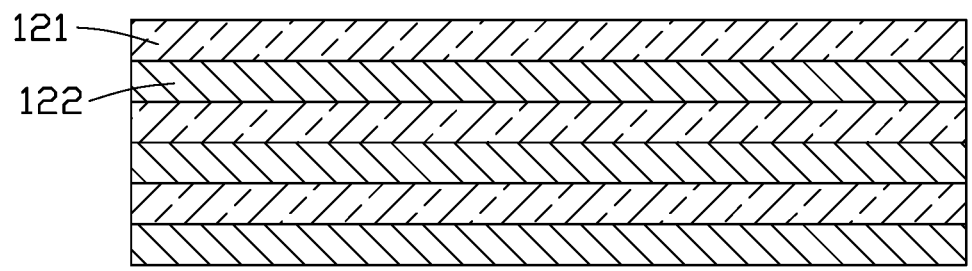
FIG. 2 shows a schematic diagram illustrating a structure of a translucency-enhancing layer of the lens assembly according to an embodiment of the present application.

Referring to FIG. 1 and FIG. 2, in one embodiment, the lens assembly 100 includes a waveguide substrate 10, a wiring layer 20, a protective layer 30, an eye tracking component 40, and a lens 50.

The waveguide substrate 10 includes a first surface 101 and a second surface 102. The first surface 101 and the second surface 102 are defined on opposite sides of the waveguide substrate 10. The first surface 101 and the second surface 102 may be planar or curved, and specific shapes of the first surface 101 and the second surface 102 may be adjusted according to actual design requirements.

In one embodiment, the waveguide substrate 10 is provided with a grating structure (not shown in the figure). The grating structure enables the light to be refracted multiple times within the waveguide substrate 10 and then transmitted in one direction. The grating structure may be a binary grating, a two-dimensional grating, or an inclined grating.

The wiring layer 20 is disposed on the first surface 101. In one embodiment, the wiring layer 20 is molded directly onto the first surface 101 of the waveguide substrate 10, reducing the processing procedure and the thickness of the entire lens assembly 100. The protective layer 30 is disposed on the first surface 101 and covers the wiring layer 20 to protect the wiring layer 20. The eye tracking component 40 is disposed within the protective layer 30 and is electrically connected to the wiring layer 20 for tracking position of the eye. The lens 50 is connected to a side of the protective layer 30 away from the waveguide substrate 10.

In the lens assembly 100 of the present application, the wiring layer 20 is directly disposed on the surface of the waveguide substrate 10, which can simplify the processing procedure of the lens assembly 100, and there is no need to provide an additional auxiliary structure between the waveguide substrate 10 and the wiring layer 20, thereby reducing the thickness of the entire lens assembly 100 and realizing the thinness of the lens assembly 100.

In one embodiment, the waveguide substrate 10 is mainly made of plastic. The waveguide substrate 10 made of plastic is thinner, lighter, and has a lower cost than the waveguide substrate 10 made of glass. Furthermore, the waveguide substrate 10 made of plastic is not easy to be degummed, and the wiring layer 20 can be directly processed on the waveguide substrate 10. In addition, the waveguide substrate 10 made of plastic is not easy to be damaged during processing, which can reduce the processing difficulty.

The plastic material of the waveguide substrate 10 may include at least one of polyethylene terephthalate (PET), polymethyl methacrylate (PMMA), and other polymer materials. The plastic material may be other flexible material with light transmittance performance. The weight of the entire lens assembly 100 can be reduced.

Referring to FIG. 1 and FIG. 2, in one embodiment, the waveguide substrate 10 includes a main body layer 11 and a transmittance-enhancing layer 12. The main body layer 11 is a plastic layer, and the plastic layer is made of the plastic material as described above. The transmittance-enhancing layer 12 is disposed on one or both sides of the main body layer 11, and the transmittance-enhancing layer 12 is integrally molded with the main body layer 11. A thickness of the transmittance-enhancing layer 12 is 0.1 nm~1 um, and shape of transmittance-enhancing layer 12 is adapted to shape of the main body layer 11.

In some embodiments, the transmittance-enhancing layer 12 is provided as one, which is integrally molded on a side of the main body layer 11 away from the wiring layer 20.

In other embodiments, the permeation-enhancing layer 12 is provided as two, with the two transmittance-enhancing layer 12 being integrally molded on opposite sides of the main body layer 11.

Referring to FIG. 1 and FIG. 2, in one embodiment, the transmittance-enhancing layer 12 includes a plurality of first material layers 121 and a plurality of second material layers 122. The plurality of first material layers 121 and the plurality of second material layers 122 are alternately stacked. In one embodiment, the plurality of first material layers 121 and the plurality of second material layers 122 can be stacked and molded by means of low temperature sputtering. The first material layer 121 and the second material layer 122 have different refractive indices, thereby forming a Bragg reflection structure. The transmittance-enhancing layer 12 adopts the Bragg reflection structure, and its reflectivity is up to 99% or more. The transmittance-enhancing layer 12 does not have the problem of absorption of light, and can also be configured to adjust position of energy gap by changing the refractive indices or thicknesses of the materials of the first material layer 121 and the second material layer 122, so as to design lens with different ranges of operating frequencies.

In one embodiment, the first material layer 121 has a first refractive index, the second material layer 122 has a second refractive index. The first refractive index is greater than the second refractive index. The first material layer 121 is made of titanium dioxide or tantalum pentoxide. The second material layer 122 is made of silicon dioxide. The titanium dioxide and tantalum pentoxide both have a high refractive index, and the silicon dioxide has a low refractive index. Wherein, the titanium dioxide has a refractive index of 2.4 to 2.6, the tantalum pentoxide has a refractive index of 2.2, and the silicon dioxide has a refractive index of 1.4 to 1.5.

Each of the plurality of first material layers 121 and each of the plurality of second material layers 122 has the same thickness. The thickness of each first material layer 121 or each second material layer 122 is one-fourth of a predetermined wavelength of the incident light.

Referring to FIG. 1, in one embodiment, the wiring layer 20 includes conductive wires 21 and pads 22. The conductive wires 21 and pads 22 are made of a conductive material, such as copper or silver. The conductive wires 21 are disposed on the first surface 101, and may be disposed directly onto the waveguide substrate 10 by methods such as physical vapor deposition or chemical vapor deposition, etc. The pads 22 are fixed to the conductive wires 21 and are electrically connected to the conductive wires 21. The eye-tracking component 40 is electrically connected to the conductive wires 21 through the pads 22.

In one embodiment, the conductive wires 21 has a line width of 0.1 nm to 1 mm, and a line height of 1 nm to 5 um.

Referring to FIG. 1, in one embodiment, the eye tracking component 40 includes a light emitting member 41 and a receiving member (not shown). The light emitting member 41 may be an LED lamp or a vertical cavity surface emitting laser, which is provided towards the eye. The light emitting member 41 is fixed to the pads 22 and electrically connected to the conductive wires 21 through the pads 22. The receiving member may be a photosensitive element or a camera, etc., and the receiving member is fixed to the pads 22 and electrically connected to the conductive wires 21 via the pads 22. The light emitting member 41 is configured to emit a first localization ray to the eyeball. The first localization ray is reflected by the eyeball to form a second localization ray, and the receiving member receives the second localization ray for tracking the eyeball.

In one embodiment, a quantity of light emitting members 41 is at least three. The at least three light emitting members 41 are disposed in sequential intervals along a horizontal direction, and the at least three light emitting members 41 are disposed toward the eyeball to emit light rays toward the eyeball from a plurality of directions, so as to improve the precision of tracking of the eyeball by the eye tracking component 40.

Referring to FIG. 1, in one embodiment, the protective layer 30 is made of a light-permeable and insulating material, and the protective layer 30 covers the conductive wires 21 and the pads 22. The material of the protective layer 30 may be an inorganic or organic material, such as silicon or resin, etc. The thickness of the protective layer 30 is 1 nm~180 um, which is greater than the thickness of the wiring layer 20 to completely encapsulate the wiring layer 20, ensuring insulation between the conductive wires 21, and protecting the conductive wires 21 and the pads 22.

The protective layer 30 covers the eye tracking component 40 to protect the eye tracking component 40. Since the protective layer 30 is made of the light-permeable material, the protective layer 30 will not obstruct the light emitting member 41 from emitting the first localization ray and the receiving member from receiving the second localization ray.

After processing the conductive wires 21 and the pads 22 on the first surface 101 of the waveguide substrate 10, the light emitting member 41 and the receiving member are fixed to the corresponding pads 22 and electrically connected. Subsequently, the protective layer 30 is disposed directly onto the first surface 101 of the waveguide substrate 10 to encapsulate the conductive wires 21, the pads 22, the light emitting members 41, and the receiving members.

Referring to FIG. 1, in one embodiment, the lens assembly 100 further includes an adhesive layer 60, the adhesive layer 60 is disposed between the protective layer 30 and the lens 50. The adhesive layer 60 is bonded to the protective layer 30 and the lens 50. A thickness of the adhesive layer 60 is 1 um to 100 um. An optical adhesive is used to make the adhesive layer 60. The optical adhesive may be an OCA (Optically Clear Adhesive) optical adhesive or an OCR (Optical Clear Resin) optical adhesive, which does not affect the transmission of light.

The lens 50 is made of plastic material, such as polyester resin for optics (OK P4), polycarbonate (PC), or cyclic olefin polymer.

Figure 3:
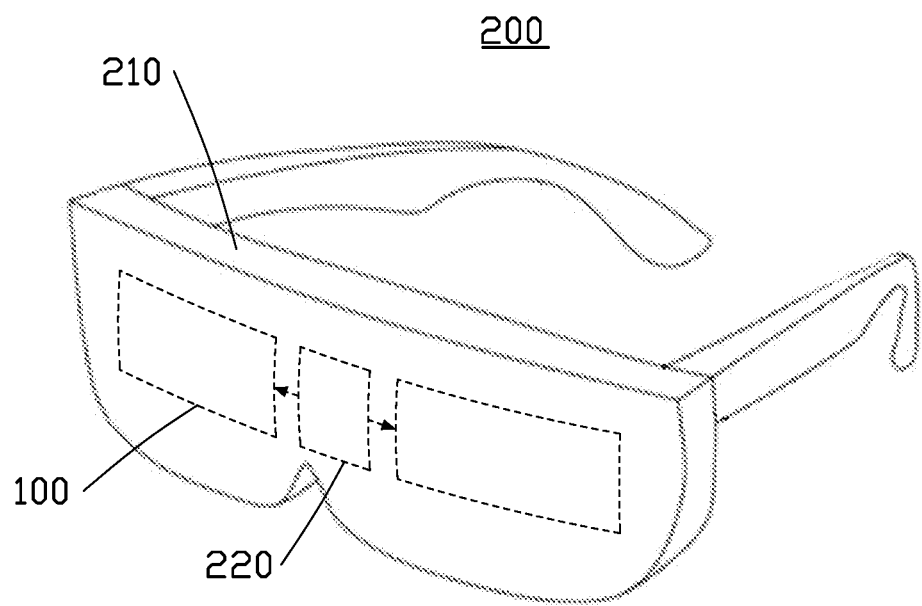
FIG. 3 shows a schematic diagram illustrating the structure of an AR glasses according to an embodiment of the present application.

Referring to FIG. 1 and FIG. 3, one embodiment of the present application also provides an AR glasses 200. The AR glasses 200 includes a display device 220 and two of the lens assemblies 100. The display device 220 is positioned between the two lens assemblies 100 for emitting image rays to the waveguide substrate 10 of the two lens assemblies 100, and the image rays pass through the grating structure provided on the waveguide substrate 10 and are refracted several times before being projected to the eye along a predetermined light way.

The AR glasses 200 further includes a frame 210. The two lens assemblies 100 are spaced apart and mounted on a side of the frame 210 facing the eyeball. A display device 220 is mounted on the frame 210 and is located at an intermediate position between the two lens assemblies 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens assembly, comprising:
a waveguide substrate comprising a first surface;
a wiring layer provided on the first surface;
a protective layer provided on the first surface and configured to cover the wiring layer;
an eye tracking component positioned in the protective layer and electrically connected to the wiring layer for tracking a position of an eyeball; and
a lens connected to a side of the protective layer away from the waveguide substrate.

2. The lens assembly as claimed in claim 1, wherein the waveguide substrate further comprises a main body layer and a transmittance-enhancing layer, the main body layer is a plastic layer, and the transmittance-enhancing layer is disposed on one or both sides of the main body layer.

3. The lens assembly as claimed in claim 2, wherein the transmittance-enhancing layer comprises a plurality of first material layers and a plurality of second material layers, the plurality of first material layers and the plurality of second material layers are provided in alternating layers.

4. The lens assembly as claimed in claim 3, wherein the plurality of first material layers has a first refractive index and the plurality of second material layers has a second refractive index, the first refractive index is greater than the second refractive index.

5. The lens assembly as claimed in claim 3, wherein a thickness of each of the plurality of first material layers is same as a thickness of each of the plurality of second material layers.

6. The lens assembly as claimed in claim 1, wherein the wiring layer comprises conductive wires and pads, the conductive wires are disposed on the first surface, and the eye tracking component is electrically connected to the conductive wires via the pads.

7. The lens assembly as claimed in claim 6, wherein the protective layer covers the conductive wires and pads and is insulated from the conductive wires and the pads.

8. The lens assembly as claimed in claim 6, wherein the eye tracking component comprises a light emitting member that is electrically connected to the conductive wires via the pads and is configured to emit a first localization ray to the eyeball, the first localization ray is reflected by the eyeball to form a second localization ray, the eye tracking component receives the second localization ray for tracking the eyeball.

9. The lens assembly as claimed in claim 1, further comprising an adhesive layer, wherein the adhesive layer is disposed between the protective layer and the lens and is bonded to the protective layer and the lens.

10. An Augmented Reality (AR) glasses, comprising:
a display device;
two lens assemblies, each of the two lens assemblies comprising:
a waveguide substrate comprising a first surface;
a wiring layer provided on the first surface;
a protective layer provided on the first surface, and configured to cover the wiring layer;
an eye tracking component positioned in the protective layer and electrically connected to the wiring layer for tracking a position of an eyeball;
a lens connected to a side of the protective layer away from the waveguide substrate; and
wherein the display device is disposed between the two lens assemblies, the display device is configured for emitting image rays to the waveguide substrates of each of the two lens assemblies.

11. The AR glasses as claimed in claim 10, wherein the waveguide substrate further comprises a main body layer and a transmittance-enhancing layer, the main body layer is a plastic layer, and the transmittance-enhancing layer is disposed on one or both sides of the main body layer.

12. The AR glasses as claimed in claim 11, wherein the transmittance-enhancing layer comprises a plurality of first material layers and a plurality of second material layers, the plurality of first material layers and the plurality of second material layers are provided in alternating layers.

13. The AR glasses as claimed in claim 12, wherein the plurality of first material layers has a first refractive index and the plurality of second material layers has a second refractive index, the first refractive index is greater than the second refractive index.

14. The AR glasses as claimed in claim 12, wherein a thickness of each of the plurality of first material layers is same as a thickness of each of the plurality of second material layers.

15. The AR glasses as claimed in claim 10, wherein the wiring layer comprises conductive wires and pads, the conductive wires are disposed on the first surface, and the eye tracking component is electrically connected to the conductive wires via the pads.

16. The AR glasses as claimed in claim 15, wherein the protective layer covers the conductive wires and pads, and is insulated from the conductive wires and the pads.

17. The AR glasses as claimed in claim 15, wherein, the eye tracking component comprises a light emitting member, the light emitting member is electrically connected to the conductive wires via the pads, and is configured to emit a first localization ray to the eyeball, the first localization ray is reflected by the eyeball to form a second localization ray, the eye tracking component receives the second localization ray for tracking the eyeball.

18. The AR glasses as claimed in claim 10, further comprising an adhesive layer, wherein the adhesive layer is disposed between the protective layer and the lens, and is bonded to the protective layer and the lens.

* * * * *